Nov. 17, 1959   R. W. COURTNEY ET AL   2,913,255
MOTORCYCLE FRONT WHEEL SUSPENSION AND STEERING ARRANGEMENT
Filed Sept. 10, 1956   2 Sheets-Sheet 2
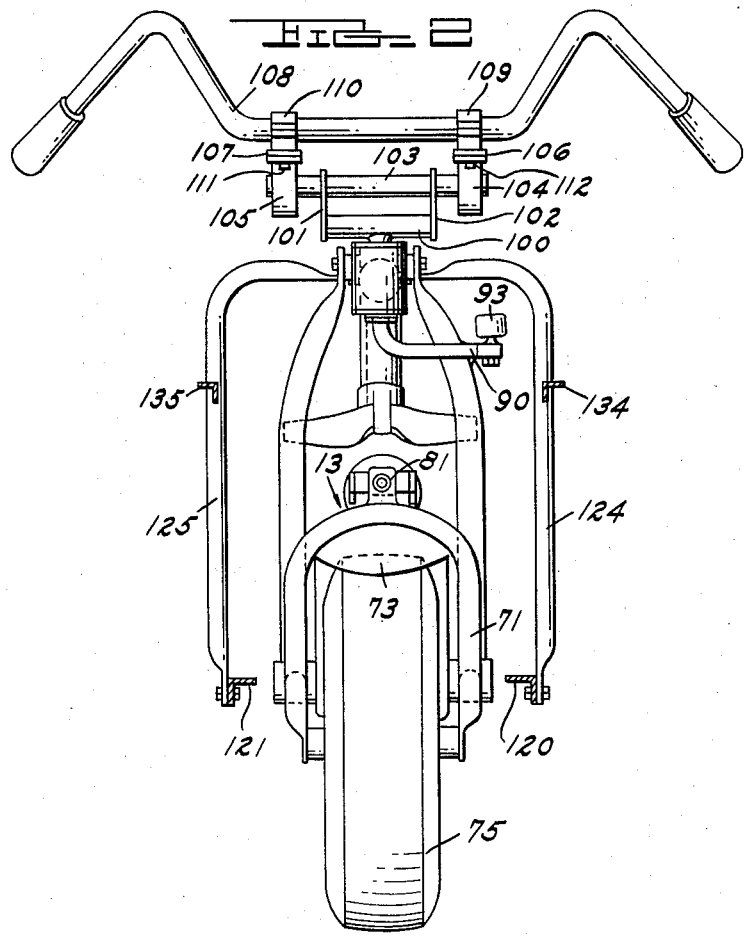
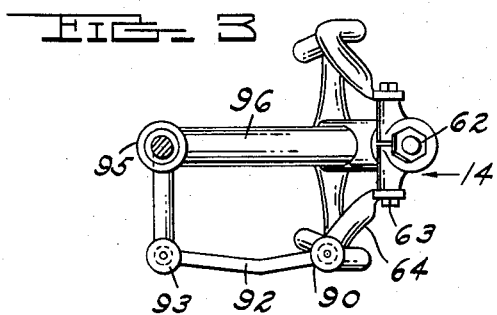
INVENTORS
ORLEY RAY COURTNEY
RAY W. COURTNEY
BY
ATTORNEY

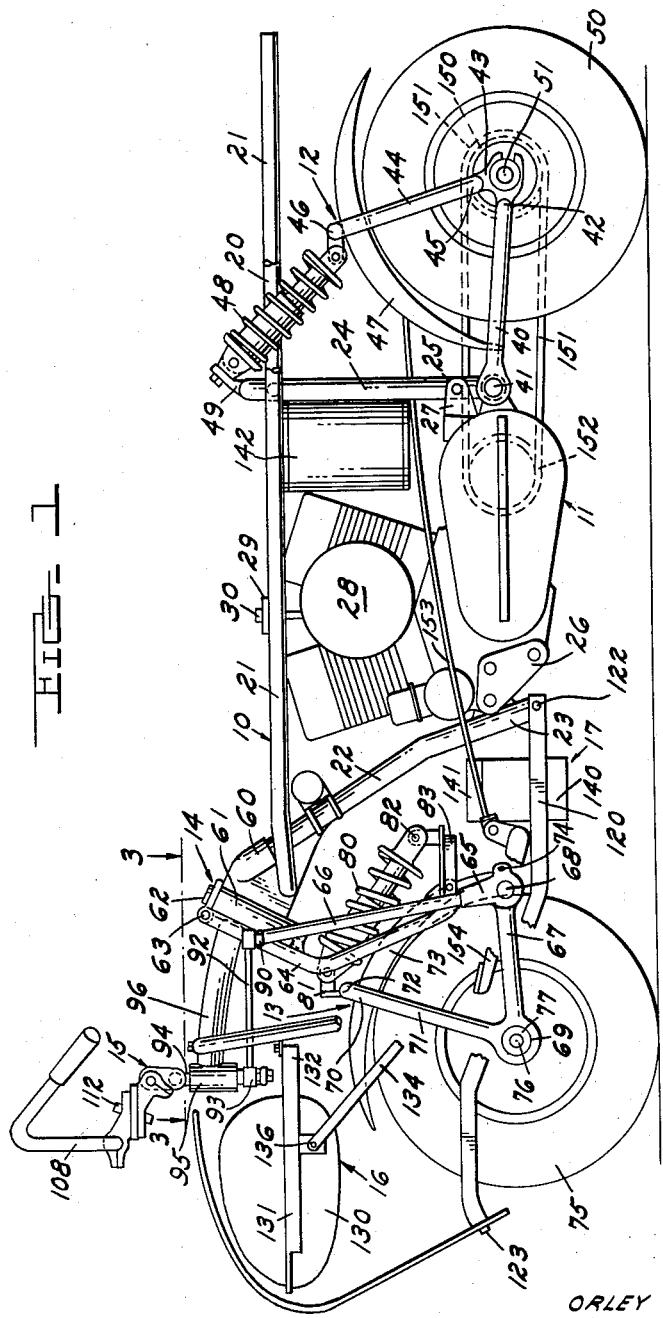

United States Patent Office 2,913,255
Patented Nov. 17, 1959

2,913,255

MOTORCYCLE FRONT WHEEL SUSPENSION AND STEERING ARRANGEMENT

Ray W. Courtney, Drayton Plains, and Orley Ray Courtney, Pontiac, Mich.

Application September 10, 1956, Serial No. 608,968

12 Claims. (Cl. 280—277)

This invention generally relates to vehicle construction, wheel suspension, and steering, and more particularly pertains to a new novel and inventive motor-cycle frame, wheel suspension, steering arrangement, battery hanger, and gas tank integration.

Vehicle and motor-cycle frames, wheel suspensions, steering arrangements, gas tank, and battery hanger arrangements, and motor support devices have been employed heretofore to facilitate the manufacture and integration of vehicle and motor-cycle assemblies, however, the several devices of the prior art have not proven entirely satisfactory inasmuch as they are complicated in design and construction, expensive to manufacture, and difficult to maintain and repair.

With the foregoing in view, the primary object of the invention is to provide a vehicle or motor-cycle frame assembly which is simple in design and construction, inexpensive to manufacture, easy to integrate, and easy to remove and repair without laborious time.

An object of the invention is to provide a wheel support which is triangular in integration with one corner thereof freely pivotally mounted on a frame member, a wheel rotatably mounted at another corner thereof, and a resilient support connected to the third corner of the triangular wheel support resiliently supporting the vehicle on the wheel and the wheel relative to the vehicle.

An object of the invention is to provide wheel turning means for steering in conjunction with the novel wheel resilient support which includes a fork kingpin having rearwardly and downwardly depending legs pivotally connected to the wheel triangular suspension or cage with the boss or abutment on the fork for the purposes of supporting the resilient support member between the wheel triangular support and the steering fork.

An object of the invention is to provide a steering or handle bar post adjacent the kingpin and lever arms connected to the kingpin and steering post interconnected by the tie rod so that the steering post can be positioned forwardly of the steering fork kingpin.

An object of the invention is to provide a bracket arrangement for supporting the steering means or handle bars using rubber as a shock damping means to prevent the transfer of vibration to the steering means or handle bars.

An object of the invention is to provide a vehicle frame and wheel construction which can be manufactured inexpensively as the component parts are easily made and the assembly of parts readily accomplished.

An object of the invention is to provide a frame and wheel suspension which can be fitted to all sizes of vehicles either two or four wheeled without changes in its assembly or arrangement of parts.

An object of the invention is to provide a motor-cycle handle bar arrangement spaced substantially forwardly of the steering fork kingpin.

These and other objects of the invention will become apparent by reference to the following description of the vehicle or motor-cycle embodying the inventions taken in connection with the accompanying drawings in which:

Fig. 1 is a side elevational view of a vehicle or motor-cycle with parts broken away to more clearly show the structural integration.

Fig. 2 is a front elevational view of the device seen in Fig. 1; and

Fig. 3 is a fragmentary cross-sectional view of Fig. 1 taken on the line 3—3 thereof.

Referring now to the drawings wherein like numerals refer to like and corresponding parts throughout the several views, the motor-cycle or vehicle disclosed therein to illustrate the invention comprises a vehicle frame 10 having a motor 11 triangularly mounted thereon, a rear wheel triangular suspension 12 supporting the rear of the frame 10, a front wheel triangular suspension 13 supporting the front of the frame 10, a front wheel steering fork assembly 14 turnably supporting the front wheel suspension 13, a handle bar steering arrangement 15 adapted to pivot the steering fork assembly 14, a gas tank mounting assembly 16 on the frame 10, and a battery mounting assembly 17 on the frame 10.

More particularly, the frame assembly 10 comprises paired top members 21, a front depending frame member 22 leading substantially vertically downwardly from the front of the top members 21 and terminating in a lower end 23, and a rear substantially vertical member 24 attached to the frame members 21 and spaced rearwardly from the front frame member 22 and terminating in a bottom end 25. The motor 11 is equipped with a front bracket 26 connected to the bottom end 23 of the front vertical frame member 22, a back bracket 27 connected to the bottom end 25 of the rear vertical frame member 24 and the motor block 28 is connected to the top member 22 via the cross bar 29 and the stud 30. It can now be seen that the connection between the motor 11 and the frame 10 is triangular as defined by the motor attaching brackets 26 and 27 and the stud 30 so that the motor is triangularly hung on the frame and the frame inflexibly reinforced by the motor 11 using the motor 11 as a triangular truss.

The rear wheel mounting assembly 12 comprises paired lineal support members 40 pivotally connected to the bottom end 25 of the frame member 24 as at 41 and having a rearwardly extending end 42 terminating in a wheel axle support plate 43; the bow member 44 is equipped with paired ends 45 fixedly secured to the paired plates 43 and includes an interconnecting yoke portion 46; the arcuate triangulating member 47 is fixedly connected at one end to the lineal side support members 40 adjacent the pivot 41 and fixedly connected to the bow member 44 at the yoke 46 so that said paired lineal members 40, said bow member 44, and said arcuate member 47, form a triangular inflexible rear wheel supporting cage freely pivotally mounted as at the point 41 with the pivotal movement of the mounting at the pivot point 41 controlled by the spring and shock absorber arrangement or resilient support 48 which is pivotally connected to the bow member 44 as at the yoke 46 and to the frame as at 49 with the wheel 50 rotatably mounted on the paired support plates 43 on the axle 51. It can now be seen that the rear wheel 50 resiliently supports the rear end of the frame 10 via the triangulated wheel support cage or suspension 12 in conjunction with the resilient support 48 so as to flexibly support the load of the motor-cycle or vehicle at the rear in conjunction with road variations. It is to be further noted that the substantially horizontal paired lineal members are disposed substantially horizontally and provide direct support to the wheel in conjunction with vehicle propulsion and braking while the bow member 44 rises upwardly to the yoke 46 and due to the fact that the resilient support 48 controls the pivotal motion at 41 via the bow member yoke 46 it is obvious that the resilient support 48 has a lever wise advantage for controlling the pivotal movement of the point 41. It is to be further noted that the arcuate triangular member 47 is formed in the configuration of a rear fender and is made of heavy gauge metal to provide a triangulating connecting leg between the lineal support members 41 and the bow 44.

The front steering and wheel support assembly 14 comprises a web member 60 which is connected to the frame top members 21 and to the front frame member 22 and includes the steering fork kingpin bearing 61 in which is pivotally mounted the steering fork kingpin 62 and the steering fork arms 64 are connected to the top of the kingpin 62 as at 63 and the paired fork members 64 extend downwardly and rearwardly and terminate in the socket 65; a brace member 66 is disposed between points adjacent the socket 65 and adjacent the kingpin 62 the purposes of reinforcing the fork members 64. Paired front wheel support lineal members 67 are freely pivotally connected in the sockets 65 as at 68 and extend forwardly and terminate in the wheel axle paired brackets 69 while the front bow member 70 is equipped with paired arms 71 connected to the plates 69 and the yoke 72 is connected to the arcuate heavy gauge triangulating brace 73 which is fixedly connected to the bow portion yoke 72 and is fixedly connected to the socket 68 as at 74 so that the paired lineal members 67, bow member 71, and the triangulating arcuate member 73 form a triangulated wheel supporting cage with the wheel 75 pivotally mounted as at 76 on the axle 77 disposed between the plates 69; the bow member yoke 72 is connected to the resilient support 80 as at 81 at one end and the resilient support 80 at the other end is connected as at 82 and is fixedly supported to the steering fork members 64 by the spanning bracket or yoke 83 which is secured to the fork members 64.

It can now be seen that by pivoting the kingpin 62 in the socket 61 that the fork members 64 are turned, which action is transferred to the triangulated wheel supporting cage and to the front wheel 75 to facilitate turning the vehicle or motor-cycle.

It is to be noted that road shocks and vehicle load will cause the wheel supporting cage composed of the members 67, 71 and 73 to pivot as at 68 which pivoting is controlled by the resilient support 80 bi-directionally as to cushion shocks and dampen reactions thereto.

The front wheel steering arrangement and wheel support assembly is adapted to be turned via the lever arm 90 on the steering fork arm 64, the tie rod 92, the steering post lever arm 93 attached to the steering post 94 which is pivotally mounted in the steering post bearing 95 which is supported on the end of the cantilevered arm 96 which is attached to the kingpin bearing and web member 60. It is to be noted that the steering post 94 is located well forward of the kingpin 62 thereby permitting the rider to ride closely adjacent the kingpin 62 and directly adjacent the wheel 75 and it is obvious that by pivoting the post 94 that the kingpin 62 is pivoted in the kingpin bearing 61 via the lever arms 90 and 93 and the interconnecting tie rod 92.

The handle bar 108 is mounted relative to the steering post 94 via the T-bar 100, brackets 101 and 102 on the T-bar 100, the cross bar 103 on the brackets 101 and 102 and the brackets 104 and 105 on the cross bar 103, and the rubber cushions 106 and 107 on the brackets 104 and 105. The handle bar 108 is equipped with brackets 109 and 110 which interfit with the brackets 104 and 105 and the rubber cushions 106 and 107 respectively together with the securing bolts 111 and 112 so that any shock produced by the vehicle or any vibrations caused by the motor are completely damped in the handle bar 108 via the rubber cushions 106 and 107 and it is to be particularly noted that no road wheel shocks are transferred to the handle bars 108 due to the fact that the handle bar 108 is not mounted on the steering fork kingpin 62.

Paired horizontal body sheet metal supporting beams 120 and 121 are connected to the frame 10 as at 122 and are joined at their forward interconnecting ends as at 123 and are supported at their rear area by the connection 122 and are supported between the points 122 and 123 by the inverted L-shape members 124 and 125 which are connected at their tops to the cantilevered bar 96 and at their bottoms to the beams 120 and 121 respectively and it is to be noted that the front steering fork arrangement and wheel cage resilient suspension is easily turnable within the confines of the paired support beams 120 and 121 and the L-shape supports 124 and 125.

The gas tank arrangement 16 includes a gas tank 130, a gas tank receiving yoke 131 which is connected at its base to the L-shape braces 124 and 125 as at 132 so that the gas tank 130 is cantilevered forwardly over the front wheel and completely clear of the rider and the gas tank 130 is supported in its extended projecting position by the triangulating brace members 134 and 135 which are connected to the gas tank bracket 131 as at 136 at their top ends and are connected to the L-shaped brackets 124 and 125 at their bottom ends.

The battery hanger 17 comprises a battery container 140 in which the battery 141 sits and the container 140 is fixedly mounted as by welding between the beams 124 and 125 and the area above the battery 141 is clear for the insertion of a motor self-starter if desired and it is also to be noted that the area of the battery hanger container 140 is large enough to receive a larger than normal motor-cycle battery of either the 6 or 12 volt variety for the purposes of energising a starter motor and other electrical equipment. The frame also provides means for supporting the oil tank 142 and other equipment.

The rear wheel is provided with a sprocket 150 for receiving the chain 151 which is driven by the motor sprocket 152 and the brake cable 153 to the rear wheel is operated by the foot lever 154 and this foot lever is pivotally mounted adjacent the beam 120. A front wheel brake not shown, can be of the handle bar hand pressure type or foot operated as desired and it is to be particularly noted that in propelling and braking that the wheel cage support lineal members 40 at the rear wheel 50 and the front wheel support lineal members 67 at the front wheel 75 are disposed substantially horizontally and provide strong thrust members axially opposed to braking and propelling thrusts as well as road shocks.

In use or operation the driver sits on a seat straddling the frame members 20 and 21 closely adjacent the kingpin 62 and grasps the handle bars 108 so that he is positioned well forwardly of the motor and to the rear of the gas tank and closely adjacent the balance of the vehicle in the kingpin 62 pivot bearing 61 so that he is provided with a feel relative to the turning of the front wheel and the balance of the motor-cycle and it is to be noted that the motor 11 is mounted closely adjacent the rear wheel 50 so that the motor weight is over half imposed on the rear wheel and the distance between the kingpin bearing 61 and the rear shock absorber 49 is sufficient to accommodate two riders one of which would be substantially over the oil tank 142.

In turning the vehicle the driver turns the handle bar 108 which in turn turns the steering post 94 to swing the lever arm 93 which moves the tie rod 92 and the kingpin lever arm 90 to turn the front wheel fork members 64 as supported by the pivotally mounted kingpin 62 and the paired fork members 64 impart their motion via the pivotal connections 68 to the wheel support cage as comprised of the members 67, 71 and 73 which form an inflexible supporting triangle relative to the front wheel 75; the triangle is resiliently supported by the resilient support 80 disposed between the bow yoke 72 and the steering fork yoke 83 so that the wheel 75 is free to rise and lower relative to the vehicle via the pivot point 68 as cushioned and damped by the resilient support 80.

The rear wheel 50 is also rotatably and resiliently mounted relative to the vehicle by the triangular wheel or cage support comprised of the members 40, 44 and 47 which are pivotally mounted as at 41 to the rear frame vertical member 24 and it is to be noted that this inflexibly triangulated wheel support is resiliently supported by the resilient support 48 pivotally connected as at 46 to the bow member yoke 44 and the bracket 49 at the top of the rear vertical frame member 24. It is to be particularly noted that the triangulating member 47 is disposed arcuately so as to be substantially partially concentric to the wheel 50 in its contiguous area and that it may be convenienty formed as a rear fender member of heavy gauge material to provide sufficient strength in interconnecting the horizontal members 40 and the lineal members 44.

The invention with these features constitutes a compact, durable, neat appearing, and well integrated vehicle easily manufactured and integrated and which provides facility for mounting various elements never previously capable of being mounted on a motor-cycle.

While the various devices of the invention have been described in conjunction with a motor-cycle it is obvious that the wheel suspension and turning members and other elements of the invention can be used with four or three wheel vehicles or any other type of vehicle requiring a resiliently suspended wheel and which also embodies the necessity of turning the wheel for steering.

Although but a single embodiment of the invention has been shown and described in detail, it is obvious that many changes may be made in the size, shape, detail, and arrangement of the various elements of the invention within the scope of the appended claims.

We claim:

1. A wheel suspension for vehicles particularly suitable for motor-cycles having a frame including a substantially vertical front support member comprising, a front wheel steering fork kingpin bearing, a steering fork kingpin pivotally disposed in said bearing; the pivotal axis of said kingpin being aligned to project toward the front wheel pivotal axis; paired fork members bowing sidewise outwardly from said kingpin having bottom ends depending downwardly and rearwardly to a point substantially rearwardly of the front wheel pivotal axis, a fork cross-piece interconnecting said fork members rearwardly of front wheel, a spring and shock absorber arrangement having one end pivotally connected to said fork cross piece and the other end projecting forwardly, a front wheel having a rotary axis disposed normal substantially on the projected axis of said steering fork bearing, paired front wheel support side members freely pivotally connected to the bottom ends of said fork members and leading forwardly therefrom having forward ends located at the axis of said wheel rotation, an axle rotatably disposed in said wheel interconnecting said paired wheel support side member front ends, a bow member leading over said wheel having paired arms fixed to said paired wheel support side member front ends, an arcuate triangulating member disposed partially concentrically to said wheel fixed to the top of said bow member and having a rear portion fixed connected to said paired fork member bottom ends; said paired front wheel support side members, said bow member, and said triangulating member forming an inflexibly triangular wheel cage freely pivotally mounted at one corner at said fork member bottom ends; and a boss on said bow member abutting the forward end of said spring and shock absorber arrangement; said spring and shock absorber arrangement bi-directionally controlling pivotal movement of said triangular front wheel support cage in conjunction with the load of the motor-cycle and road variations.

2. In a device as set forth in claim 1, a cantilevered arm having an extending end fixed on and projecting forwardly from said fork bearing, a handle bar pivot bearing mounted on the forward end of said cantilevered arm, handle bars having a post pivotally mounted in said handle bar bearing, a handle bar lever arm extending from said handle bar post, a lever arm extending from said wheel forks, kingpin, and a tie rod disposed between said levers so that when a driver moves said handle bars the motion is transmitted to said wheel fork; said handle bars being located well forward of said steering fork bearing to permit a driver to ride closely adjacent said steering fork bearing.

3. In a device as set forth in claim 2, said handle bar mounting comprising spaced paired brackets rising from said post, a handle portion disposed above and across said brackets, handle portion paired spaced brackets leading from said handle portion to a point adjacent said post brackets, rubber cushions disposed between said brackets, and bolts leading through the adjacent end of said brackets and said rubber cushions flexibly securing same together.

4. A wheel suspension for vehicles particularly suitable for motorcycles having a frame including a kingpin bearing supporting portion comprising, a front wheel steering fork kingpin bearing mounted on said frame supporting portion, a steering fork kingpin pivotally disposed in said bearing, paired fork members bowing sidewise outwardly from said kingpin having bottom ends depending downwardly and rearwardly to a point substantially rearwardly of the front wheel, a fork cross-piece interconnecting said fork member rearwardly of front wheel, a resilient support having one end connected to said fork cross piece and the other end projecting forwardly, a front wheel, paired front wheel support side members freely pivotally connected to the bottom ends of said fork members and leading forwardly therefrom having forward ends located at said front wheel, an axle rotatably disposed in said wheel interconnecting said paired wheel support side member front ends, a bow member leading over said wheel having paired arms fixed to said paired wheel support side member front ends, a brace member disposed fixed to the top of said bow member and leading rearwardly downwardly and having a rear portion fixedly connected to said paired fork member bottom ends; said paired front wheel support side members, said bow member, and said brace member forming an inflexible triangular wheel support cage freely pivotally mounted at one corner at said fork member bottom ends; and a boss on said bow member abutting the forward end of said resilient support; said resilient support bi-directionally controlling pivotal movement of said triangular front wheel support cage in conjunction with the load of the motor-cycle and road variations.

5. In a device as set forth in claim 4, a cantilevered arm having an extending end fixed on and projecting forwardly from said fork bearing, a handle bar pivot bearing mounted on the forward end of said cantilevered arm, handle bars having a post pivotally mounted in said handle bar bearing, a handle bar lever arm extending from said handle bar post, a lever arm extending from said wheel fork, kingpin, and a tie rod disposed between said lever arms so that when a driver moves said handle bars the motion is transmitted to said wheel fork; said handle bars being located well forward of said steering fork bearing to permit a driver to ride closely adjacent said steering fork bearing.

6. In a device as set forth in claim 5, said handle bar mounting comprising spaced paired brackets rising from said post, a handle portion disposed above and across said brackets, handle portion paired spaced brackets leading from said handle portion to a point adjacent said post brackets, rubber cushions disposed between said brackets, and bolts leading through the adjacent ends of said brackets and said rubber cushions flexibly securing same together.

7. A wheel suspension comprising paired arms having one end pivotally mounted at a first corner and an extending end, a wheel rotatably mounted between the extending ends of said arms at a second corner, a yoke over said wheel having a shoulder having ends fixedly connected to said paired arms extending ends at the second corner, a triangulating member having one end fixedly connected to said yoke shoulder at a third corner and its other end fixedly connected to said paired arms adjacent their pivotal connection at the first corner; said arms, yoke, and member forming an inflexibly triangular wheel support pivotally mounted at said first corner and rotatably supporting said wheel at said second corner; and a resilient support connected to said third corner controlling wheel support pivoting at said first corner in conjunction with loading and road variations at the said second corner as imposed by said wheel.

8. In a device as set forth in claim 7, a kingpin disposed adjacent said wheel having extending legs pivotally connected to said paired arms pivotally connected ends, and a coupling on said kingpin legs connected to the other end of said resilient support; said kingpin being adapted to turn said resiliently supported wheel in steering.

9. A front wheel suspension particularly suitable for two wheel vehicles such as motorcycles comprising a frame having a top front portion, a kingpin socket bearing on said frame portion inclining downwardly forwardly to provide a caster angle to the wheel to bias the wheel to a center straight ahead position and providing the front wheel pivotal steering axis, a kingpin disposed in said bearing, a steering fork having paired arms connected to said kingpin and angling rearwardly downwardly and terminating in bottom ends rearwardly of the extended axis of said kingpin, paired wheel support lineal members having rear ends pivotally connected to said fork arm bottom ends with said lineal members extending forwardly and terminating in front ends adjacent the extended axis of said kingpin, a wheel rotatably mounted between said lineal members front ends so as to locate the wheel axis at the kingpin extended axis; a bow member having a yoke overlying said wheel top and downwardly extending arms fixedly connected to said lineal members adjacent their front ends, a triangulating brace, such as a heavy gage fender, having one end connected to said bow yoke and its other end leading downwardly rearwardly and connected to said lineal members near ends, a first support bracket spanning said steering fork arms adjacent their bottom ends, a second support bracket on said bow yoke above said wheel, and a resilient member compressed between said support brackets so as to resiliently support said frame front end on said wheel with said wheels rotational axis substantially intersecting said kingpin's extended pivotal axis.

10. In a device as set forth in claim 9, a lever arm extending from said steering fork, a cantilevered frame arm post extending forwardly of said kingpin socket terminating in a forward end, handle bars pivotally mounted adjacent the forward end of said frame post, a lever arm extending from said handle bars, and a tie rod pivotally connected between said lever arms; pivotal movement of said handle bars being transferred to said wheel via said lever arms and tie rod to said steering fork and thence to said lineal members to said wheel; said handle bars being located forwardly of said kingpin axis so as to permit a rider to sit adjacent said kingpin axis with same in the position of a saddle pommel relative to the rider.

11. A front wheel suspension particularly suitable for two wheel vehicles such as motorcycles comprising a frame having a top front portion, a kingpin socket bearing on said frame portion inclining downwardly forwardly to provide a caster angle to the wheel to bias the wheel to a center straight ahead position and providing the front wheel pivotal steering axis, a kingpin disposed in said bearing, a steering fork having paired arms connected to said kingpin and angling rearwardly downwardly and terminating in bottom ends rearwardly of the extended axis of said kingpin, paired wheel support lineal members having rear ends pivotally connected to said fork arm bottom ends with said lineal members extending forwardly and terminating in front ends adjacent the extended axis of said kingpin, a wheel rotatably mounted between said lineal members front ends so as to locate the wheel axis at the kingpin extended axis; a bow member having a yoke overlying said wheel top and downwardly extending arms fixedly connected to said lineal members adjacent their front ends, a triangulating brace, such as a heavy gage fender, having one end connected to said bow yoke and its other end leading downwardly rearwardly and connected to said lineal members near ends, a first support bracket spanning said steering fork arms adjacent their bottom ends, a second support bracket on said bow yoke above said wheel, a resilient member compressed between said support brackets so as to resiliently support said frame front end on said wheel with said wheels rotational axis substantially intersecting said kingpin's extended pivotal axis and brace members interconnecting said fork ends.

12. In a device as set forth in claim 11, a lever arm extending from said steering fork, a cantilevered frame arm post extending forwardly of said kingpin socket terminating in a forward end, handle bars pivotally mounted adjacent the forward end of said frame post, a lever arm extending from said handle bars, and a tie rod pivotally connected between said lever arms; pivotal movement of said handle bars being transferred to said wheel via said lever arms and tie rod to said steering fork and thence to said lineal members to said wheel; said handle bars being located forwardly of said kingpin axis so as to permit a rider to sit adjacent said kingpin axis with same in the position of a saddle pommel relative to the rider.

References Cited in the file of this patent

UNITED STATES PATENTS

| | | |
|---|---|---|
| 1,084,654 | Meiser | Jan. 20, 1914 |
| 1,097,509 | Bamford | May 19, 1914 |
| 1,162,993 | Etwell | Dec. 7, 1915 |
| 1,261,441 | Rigby | Apr. 2, 1918 |
| 1,266,800 | Harley | May 21, 1918 |
| 1,401,032 | Baker et al. | Dec. 20, 1921 |
| 1,527,905 | Neracher | Feb. 24, 1925 |
| 1,546,257 | Scarnecchia | July 14, 1925 |
| 2,485,484 | Dean | Oct. 18, 1949 |